United States Patent [19]

Druschke et al.

[11] 4,327,015

[45] Apr. 27, 1982

[54] FLAME RESISTANT, TRANSPARENT POLYCARBONATES COMPRISING BISULFITE ADDUCTS

[75] Inventors: Frank Druschke, Stuttgart; Dieter Margotte, Krefeld; Wolfgang Cohnen, Leverkusen; Karsten Idel, Krefeld, all of Fed. Rep. of Germany

[73] Assignee: Bayer Aktiengesellschaft, Leverkusen, Fed. Rep. of Germany

[21] Appl. No.: 262,109

[22] Filed: May 11, 1981

[30] Foreign Application Priority Data

May 22, 1980 [DE] Fed. Rep. of Germany ....... 3019527

[51] Int. Cl.³ .......................... C08K 5/41; C08K 5/42
[52] U.S. Cl. ................................. 524/162; 528/198; 528/199; 524/161; 524/166
[58] Field of Search .................... 260/45.7 S, 45.7 SF

[56] References Cited

U.S. PATENT DOCUMENTS

| | | | |
|---|---|---|---|
| 3,334,154 | 8/1967 | Kim | 260/860 |
| 3,775,367 | 11/1973 | Nouvertne | 260/45.9 R |
| 3,845,007 | 10/1974 | Nouvertne et al. | 260/37 PC |
| 3,865,787 | 2/1975 | Ludwig et al. | 260/45.7 SF |
| 3,940,366 | 2/1976 | Mark | 260/45.9 R |
| 4,039,509 | 8/1977 | Mark | 260/45.8 R |

*Primary Examiner*—John Kight, III
*Assistant Examiner*—R. A. White
*Attorney, Agent, or Firm*—Gene Harsh; Lawrence S. Pope; Aron Preis

[57] ABSTRACT

The invention is directed to flame-resistant, transparent aromatic polycarbonate compositions comprising polycarbonate resin and an additive amount of a member selected from the group consisting of aldehyde-bisulphite adducts and ketone-bisulphite adducts.

5 Claims, No Drawings

FLAME RESISTANT, TRANSPARENT POLYCARBONATES COMPRISING BISULFITE ADDUCTS

FIELD OF THE INVENTION

The invention relates to aromatic polycarbonates and to flame-resistant polycarbonates, in particular.

SUMMARY OF THE INVENTION

The present invention relates to transparent, flame-resistant aromatic polycarbonates, characterized in that they contain from 0.001 to 0.4% by weight, preferably from 0.01 to 0.25% by weight, especially from 0.05 to 0.15% by weight, in each case relative to the polycarbonate content, of a material selected from the class consisting of aldehyde- or ketone-bisulphite adducts.

DESCRIPTION OF THE PRIOR ART

Flame-resistant polycarbonates are as a rule prepared by incorporation or addition of halogen or by addition of metal salts, especially alkali metal salts or alkaline earth metal salts. Both methods are subject to certain limits, in one case in respect to processability (see, for example, U.S. Pat. No. 3,334,154) and, in the other case, in respect to transparency (see, for example, U.S. Pat. No. 3,775,367) or in respect to discolorations.

DETAILED DESCRIPTION OF THE INVENTION

It is the object of the present invention to provide, in an economical manner, transparent, improved flame-resistant polycarbonates which do not show the disadvantages described above and which, in particular, retain a good long-term pattern of properties even at elevated processing temperatures.

It has been found that polycarbonates can, without loss of their transparency and without adversely effecting their processability or their long-term behavior, be prepared in a flame-resistant version if aldehyde- or ketone-bisulphite adducts in amounts of from 0.001 to 0.4% by weight, based on the weight of polycarbonate, are used as flame-retarding agents. Both monomeric and polymeric bisulphite adducts based on the appropriate monoketones or polyketones, or monoaldehydes or polyaldehydes, can equally be employed. A particular advantage is that the bisulphite adducts are economically and easily obtainable.

By aromatic polycarbonates in the sense of the present invention, there are understood homopolycarbonates and copolycarbonates which are based on, for example, one or more of the following diphenols: hydroquinone, resorcinol, dihydroxydiphenyl, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and $\alpha,\alpha'$-bis-(hydroxyphenyl)-diisopropylbenzenes, as well as their nuclear-alkylated and nuclear-halogenated compounds. These and other suitable diphenols are described, for example, in U.S. Pat. Nos. 3,028,365; 3,275,601; 3,148,172; 3,062,781; 2,991,273; 3,271,367; 2,999,835; 2,970,131 and 2,999,846, in German Offenlegungsschriften (German Published Specifications) 1,570,703; 2,063,050; 2,063,052; 2,211,956 and 2,211,957, in French Pat. No. 1,561,518 and in the monograph, "H. Schnell, Chemistry and Physics of Polycarbonates, Interscience Publishers, New York, 1964", all incorporated herein by reference.

Examples of preferred diphenols are: 4,4'-dihydroxydiphenyl; 2,2-bis-(4-hydroxyphenyl)-propane; 2,4-bis-(4-hydroxyphenyl)-2-methylbutane; 1,1-bis-(4-hydroxyphenyl)-cyclohexane; $\alpha,\alpha'$-bis-(4-hydroxyphenyl)-p-diisopropylbenzene; 2,2-bis-(3-methyl-4-hydroxyphenyl)-propane; 2,2-bis-(3-chloro-4-hydroxyphenyl)-propane; bis-(3,5-dimethyl-4-hydroxyphenyl)-propane; 2,2-bis-(3,5-dimethyl-4-hydroxyphenyl)-propane; bis-(3,5-dimethyl-4-hydroxyphenyl)-sulphone; 2,4-bis-(3,5-dimethyl-4-hydroxyphenyl)-2-methylbutane; 1,1-bis-(3,5-dimethyl-4-hydroxyphenyl)-cyclohexane; N,N'-bis-(3,5-dimethyl-4-hydroxyphenyl)-p-diisopropylbenzene; 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane; 2,2-bis-(3,5-dimethyl-4-hydroxyphenyl)-propane; 2,2-bis-(3,5-dichloro-4-hydroxyphenyl)-propane; 2,2-bis-(3,5-dibromo-4-hydroxyphenyl)-propane and 1,1-bis-(4-hydroxyphenyl)-cyclohexane.

The aromatic polycarbonates can be prepared in accordance with known processes, such as are described in the above-mentioned literature, for example in accordance with the melt transesterification process from bisphenol and diphenyl carbonate, or in the homogeneous phase (pyridine process), or in a two-phase mixture of aqueous bisphenolate solution and methylene chloride together with phosgene (phase boundary process).

The aromatic polycarbonates can be branched by the incorporation of small amounts, preferably between 0.05 and 0.2 mol % (based on diphenols employed), of trifunctional or more than trifunctional compounds, especially compounds with three or more phenolic hydroxyl groups.

Polycarbonates of this type are described, for example, in German Offenlegungsschriften (German Published Specifications) 1,570,533; 1,595,762; 2,116,974; and 2,113,347, in British Patent Specification No. 1,079,821, in U.S. Pat. No. 3,544,514 and in German Offenlegungsschrift 2,500,092, all incorporated herein by reference.

The aromatic polycarbonates should as a rule have a weight-average molecular weight ($\overline{M}_w$) of from 10,000 to more than 200,000, preferably from 15,000 to 80,000 as determined by measuring the relative solution viscosity in $CH_2Cl_2$ at 25° C. and at a concentration of 5 g/l.

Aldehyde- or ketone-adducts with alkali metal bisulphites or alkaline earth metal bisulphites, the particularly preferred embodiment, used as flame-proofing agents according to the present invention, are known. They are prepared, for example, from a saturated alkali metal or alkaline earth metal bisulphite solution and an aldehyde or a ketone and precipitate as crystalline adducts.

The preparation of such adducts employed according to the invention is carried out, for example, in accordance with U.S. Pat. No. 2,536,751, French Pat. No. 2,074,674, J. Polym. Sci. A, Volume 8 (1970), page 3196 or Houben Weyl, Volume 7/1, pages 482 et seq.

Suitable adducts in the sense of the invention are aldehyde- or ketone-bisulphite adducts of the general formulae I and II:

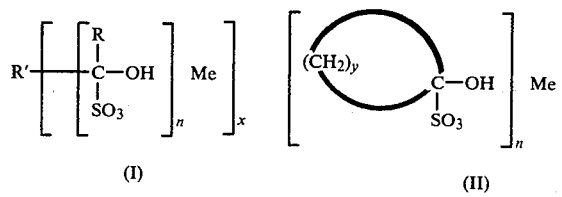

wherein
Me = an alkali metal and
n = 1, or
Me = an alkaline earth metal and
n = 2,
x = 1-4,
y = 4-10,
R = H, alkyl, cycloalkyl, alkenyl, cycloalkenyl, aryl or aralkyl, the C-radicals optionally being substituted, and
R' = R or a polyfunctional radical of a polyketone or polyaldehyde.

Preferably, R can be H, methyl or ethyl radical and R' can be R, $C_3$–$C_{18}$-alkyl or $C_6$–$C_{20}$-aryl.

The preparation of the terephthaldehyde dibisulphite adduct will be described as an example of the preparation of the adducts employed according to the invention.

7.86 g (0.075 mol) of $NaHSO_3$ are dissolved in 75 ml of water and the solution is diluted with 500 ml of methanol. 5 g (0.037 mol) of terephthalaldehyde are then added and the mixture is stirred for 60 hours at room temperature. The crystals which have precipitated are filtered and washed with methanol and ether. After vacuum drying at room temperature, about 12.5 g of adduct were obtained as a white crystalline product.

The following adducts may be mentioned by way of examples.

the additive can be effected either directly into the melt of the polycarbonate or by combining the additive with the polycarbonate solution or by mixing polycarbonate granules with the additive, for example in single-screw or twin-screw extruders.

Further suitable methods for incorporating the additive are described in DE-OS (German Published Specification) 2,460,052 (LeA 16,004), DE-OS (German Published Specification) 2,744,018 and German Patent Application P 29 33 344.6 (LeA 19,827).

The polycarbonates according to the invention may be processed in accordance with the conventional thermoplastic processing methods, such as by injection molding or extrusion, to give moldings, sheets and films having improved flame-resistance. Furthermore, cast films may be produced from the polycarbonates according to the invention.

The flame-resistant polycarbonates according to the invention can furthermore be admixed with other additives such as antistatic agents, pigments, mold release agents, heat-stabilizers, UV stabilizers and reinforcing fillers, in customary amounts and in a known manner.

The compositions according to the invention can be used in every case where flame-resistant polycarbonates have hitherto been used successfully, for example in the electrical industry and in the engineering industry.

The flame-resistant polycarbonates according to the invention obtained, in the examples which follow, in accordance with the processes described above were extruded at about 270° C. and the extrudates were comminuted to granules.

The flame-retardance was categorized in accordance with UL-94 test procedure. In this, test bars in two sample thicknesses of 1.6 mm and 3.2 mm are produced by injection molding at 300°–310° C. from the granules of the flame-resistant polycarbonates according to the invention and are tested in accordance with UL-94.

According to this test method, the materials thus

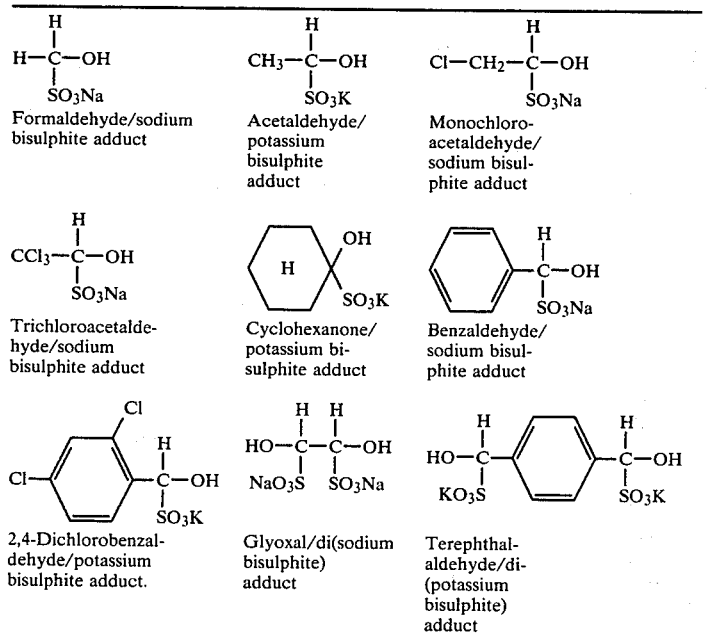

Any desired method known to those skilled in the art can be employed to prepare the polycarbonates according to the invention. For example, the incorporation of tested were classified as either UL-94 V-O, UL-94 V-I or UL-94 V-II, the classification being on the basis of the test results obtained with 5 test bars in each case. The criteria for these classifications are described briefly as follows:

UL-94 V-O: The average burning time with a flame and/or smoldering after removal of the igniting flame should not exceed five seconds and none of the samples should drip particles which ignite absorbent cotton.

UL-94 V-I: The average burning time with a flame and/or smoldering after removal of the igniting flame should not exceed 25 seconds and none of the samples should drip particles which ignite absorbent cotton.

UL-94 V-II: The burning time with a flame and/or smoldering after removal of the igniting flame should not exceed 25 seconds, but the samples drip flaming particles which ignite absorbent cotton.

Furthermore, a test bar which burned for more than 25 seconds after removal of the igniting flame was not classified according to UL-94; instead, this bar was described as "burns" according to the standard conditions of the present invention. Specification UL-94 furthermore requires that all test bars of a test must conform to the particular V-classification; otherwise, the five test bars fail that classification.

The examples which follow are intended to explain the invention in more detail. The results are summarized in Table 1 which follows.

General procedure

The preparation of the polycarbonates employed according to the present invention was carried out by reacting bis-2,2-(4-hydroxyphenyl)-propane (bisphenol A) and phosgene in a two-phase mixture of aqueous sodium hydroxide solution and methylene chloride. Triethylamine was employed as the catalyst and phenol as the chain regulator. The working up was carried out in the customary manner by evaporating the previously washed polycarbonate solution.

For Examples 1-9, a bisphenol A polycarbonate having a relative solution viscosity of 1.295 (measured in CH$_2$Cl$_2$ at 25° C. and a concentration of 5 g/l) was used. After addition of the various adducts, the mixtures were homogenized in a twin-screw extruder and the resulting granules were molded to test specimens.

selected from the group consisting of aldehyde-bisulphite adducts and ketone-bisulphite adducts.

2. The polycarbonates of claim 1, characterized in that they comprise from 0.01 to 0.25% by weight, relative to the weight of polycarbonate, of said additive.

3. The polycarbonates of claim 2, characterized in that they comprise from 0.05 to 0.15% by weight, relative to the weight of polycarbonate, of said additive.

4. The polycarbonates of claim 1, characterized in that they comprise an aldehyde- or ketone-bisulphite adduct of the formula (I)

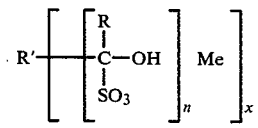

wherein
Me is an alkali metal and
n is 1, or
Me is an alkaline earth metal and
n is 2,
x is 1 to 4 and
R denotes H, alkyl, cycloalkyl, alkenyl, cycloalkenyl, aryl or aralkyl radical,
and wherein
R' is R or a polyfunctional radical of a polyketone or a polyaldehyde.

5. The polycarbonates of claim 1, characterized in that they contain a ketone-bisulphite adduct of the formula (II)

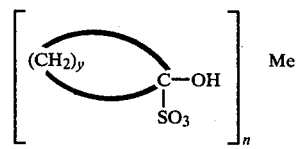

wherein
Me is an alkali metal and

TABLE 1

| Example Number | Flame-retardant additive (adduct) 0.08% by weight in each case | UL-94 classification 1.6 mm | UL-94 classification 3.2 mm |
| --- | --- | --- | --- |
| 1 | Control experiment | V-II | burns |
| 2 | Acetaldehyde/sodium bisulphite adduct | V-II | V-O |
| 3 | Monochloroacetaldehyde/sodium bisulphite adduct | V-I | V-O |
| 4 | Methyl ethyl ketone/sodium bisulphite adduct | V-II | V-I |
| 5 | Cyclohexanone/potassium bisulphite adduct | V-II | V-I |
| 6 | Terephthaldehyde/potassium bisulphite adduct | V-II | V-I |
| 7 | Benzaldehyde/sodium bisulphite adduct | V-I | V-O |
| 8 | Monochloroacetaldehyde/calcium bisulphite adduct | V-I | V-O |
| 9 | 2,4-Dichlorobenzaldehyde/potassium bisulphite adduct | V-I | V-O |

What is claimed is:

1. Polycarbonates based on diphenols, characterized in that they comprise from 0.001 to 0.4% by weight, relative to the weight of polycarbonate, of an additive n is 1, or
Me is an alkaline earth metal and
n is 2 and
y is from 4 to 10.

* * * * *